United States Patent [19]

Hayashihara et al.

[11] Patent Number: 5,373,533
[45] Date of Patent: Dec. 13, 1994

[54] FSK SIGNAL RECEIVING DEVICE

[75] Inventors: Mikio Hayashihara, Atsugi; Hiroshi Tsurumi, Tokyo; Hiroshi Tanimoto, Kawasaki, all of Japan

[73] Assignee: Kabushiki Kaisha Toshiba, Kawasaki, Japan

[21] Appl. No.: 839,165

[22] Filed: Feb. 21, 1992

[30] Foreign Application Priority Data

Feb. 22, 1991 [JP] Japan ................... 3-028201
Apr. 26, 1991 [JP] Japan ................... 3-097116

[51] Int. Cl.$^5$ ............................................. H04L 27/14
[52] U.S. Cl. ................................. 375/88; 329/303
[58] Field of Search ................... 375/88, 45; 329/300, 329/301, 303; 455/214

[56] References Cited

U.S. PATENT DOCUMENTS 4,462,107  7/1984  Vance ............................ 375/88
4,752,742  6/1988  Akaiwa ....................... 375/88 X
4,870,659  9/1989  Oishi et al. ................ 375/88 X

FOREIGN PATENT DOCUMENTS 3-82248  4/1991  Japan .

*Primary Examiner*—Tesfaldet Bocure
*Attorney, Agent, or Firm*—Finnegan, Henderson, Farabow, Garrett & Dunner

[57] ABSTRACT

An FSK signal receiving device is constituted by a first phase shifting circuit for applying a first phase shift to a first reception base band signal of first and second reception base band signals having orthogonal phases to generate a third base band signal, and generating a fourth base band signal having a phase orthogonal to the phase of the third base band signal, a second phase shifting circuit for applying the first phase shift to the second base band signal to generate a fifth reception base band signal, and a logical gate circuit for performing an exclusive OR operation on the third and fourth base band signals to obtain a first output signal, on the third and fifth base signals to obtain a second output signal, and on the first and second output signals to generate a detection signal.

15 Claims, 14 Drawing Sheets

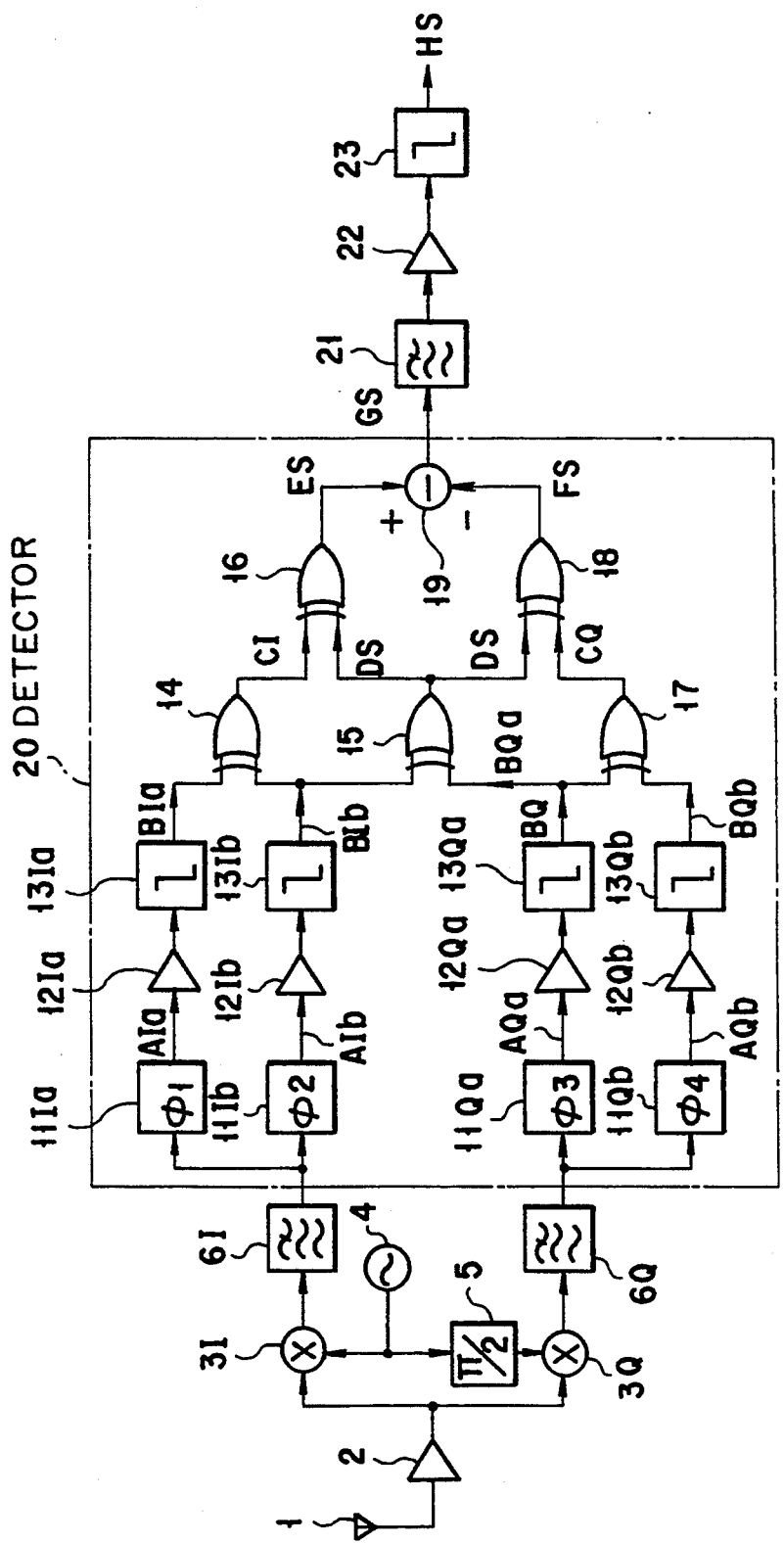
F I G. 4

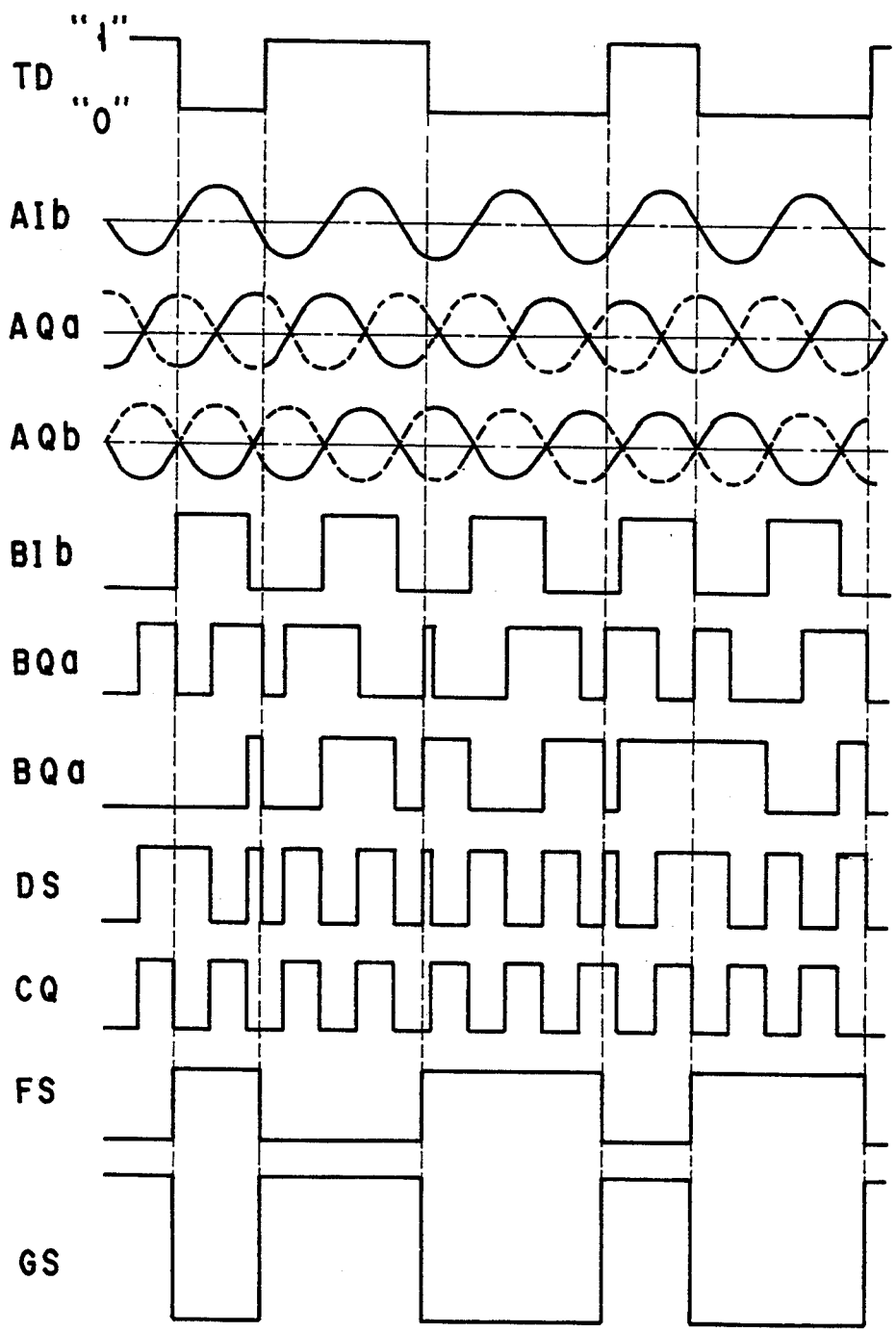
F I G. 5

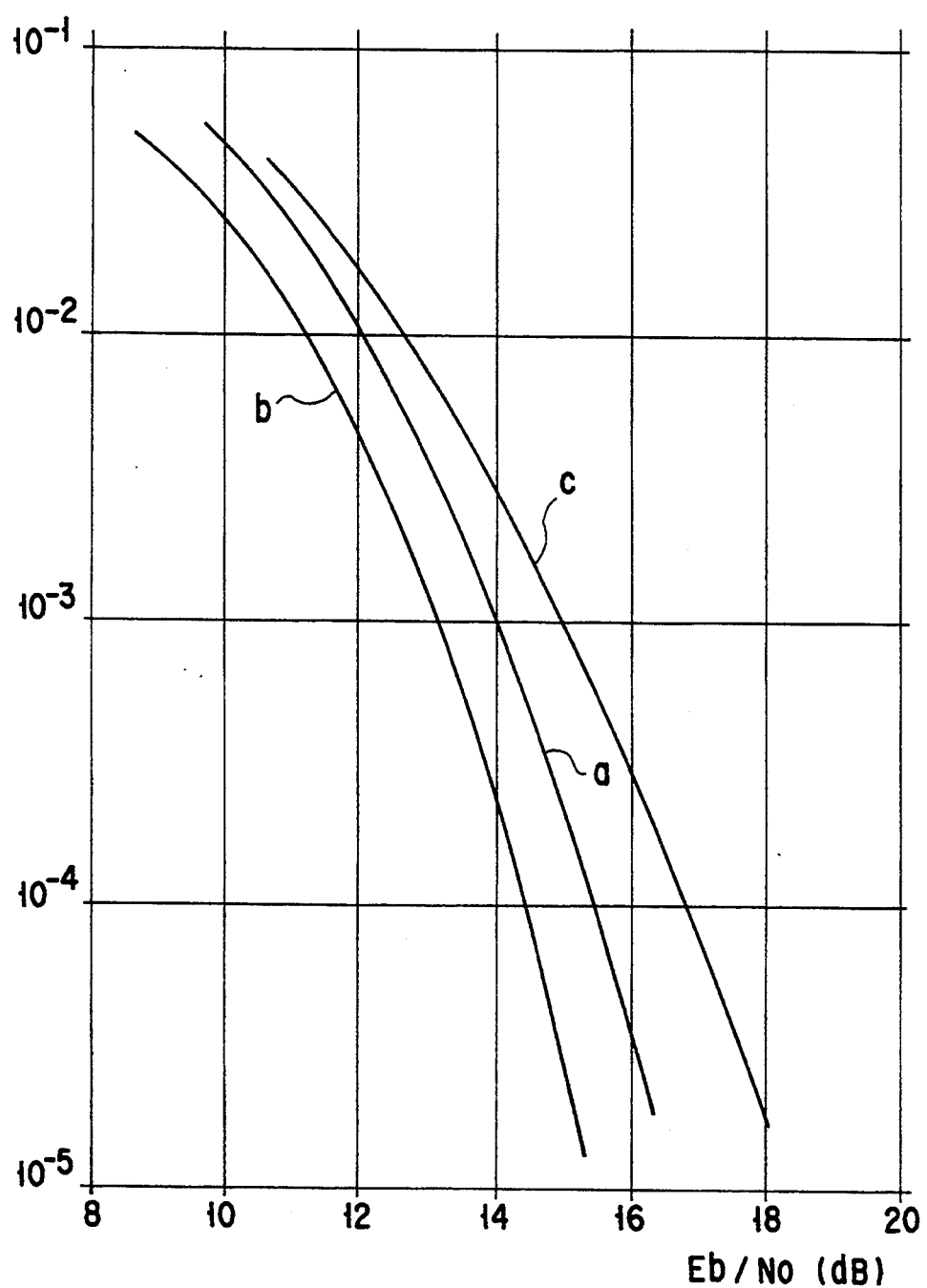
F I G. 6

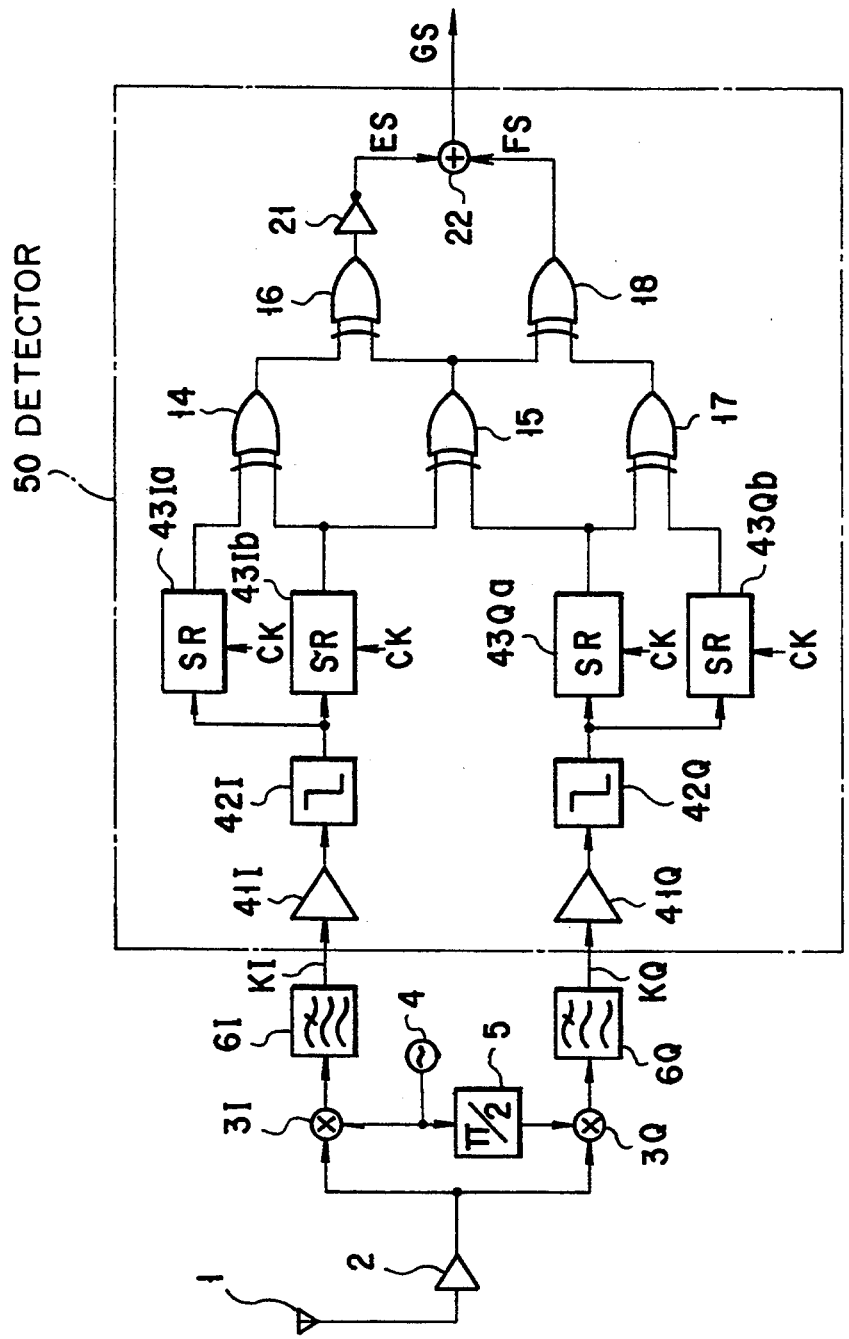
F I G. 12

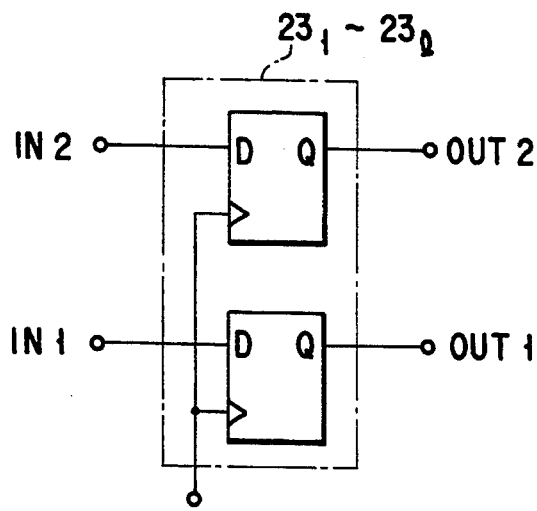
F I G. 14
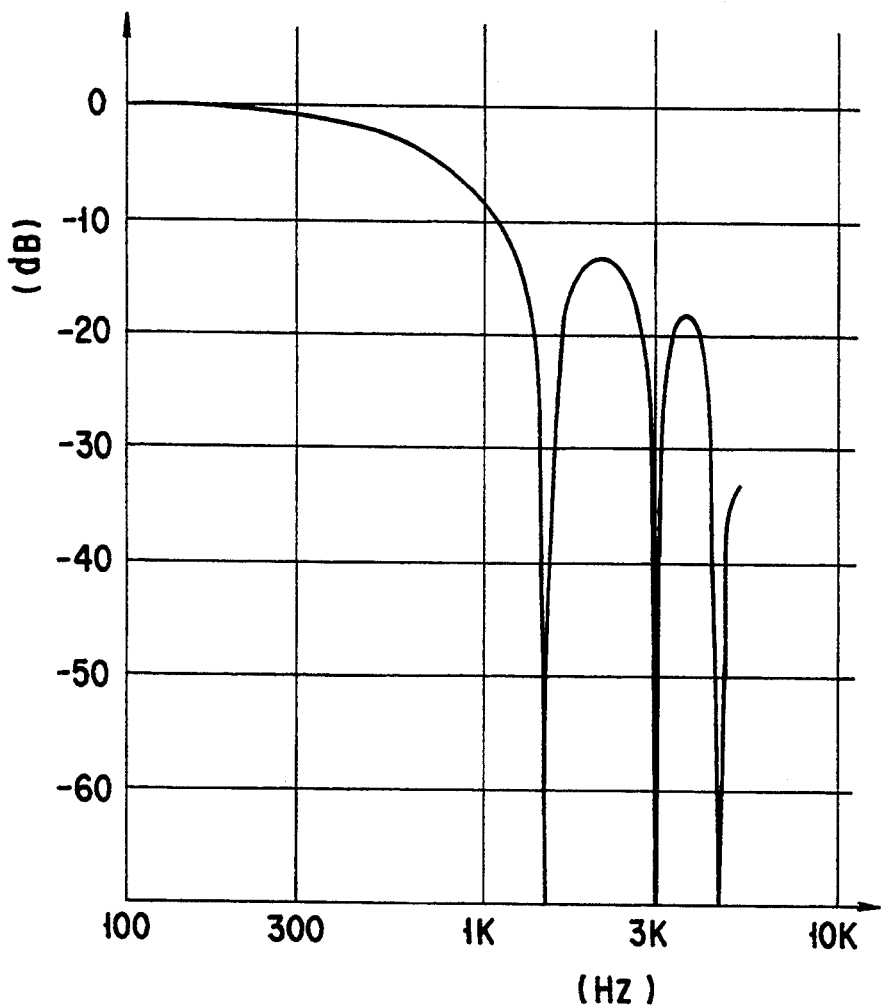
F I G. 15

5,373,533

FSK SIGNAL RECEIVING DEVICE

BACKGROUND OF THE INVENTION

1. Field of the Invention

The present invention relates to an FSK signal receiving device designed to receive and demodulate an FSK signal in a communication apparatus used in, e.g., a mobile radio communication system and an optical communication system.

2. Description of the Related Art

For example, in a mobile radio communication system, the FSK (Frequency SHIFT Keying) system is widely used as a modulation system for digital signals.

According to a conventional FSK signal receiving device, an FSK signal received through an antenna is amplified by a high frequency amplifier, and the amplified signal is input to two mixers. In these mixers, the received FSK signals are respectively mixed with a local oscillation signal generated by a local oscillator and a $\pi/2$-shifted local oscillation signal obtained by shifting the phase of the local oscillation signal by $\pi/2$ using a phase shifter, thereby performing frequency conversion. Since the frequency of the local oscillation signal is set to be substantially equal to the carrier frequency of the received FSK signal, base band signals are directly output from the mixers. The FSK demodulated signals output from the mixers are respectively input to low pass filters to remove their high-frequency components. Thereafter, the signals are respectively amplified by low frequency amplifiers and amplitude-limited by amplitude limiters. The resulting signals are input to a detector.

If the above-described conventional receiving device receives an FSK signal having a carrier frequency fc and a frequency shift $\pm\delta$ corresponding to the binary value represented by a digital signal, since a frequency fL of a local oscillation signal is set beforehand to be equal to the carrier frequency fc, and local oscillation signals to be supplied to the mixers have a phase difference $\pi/2$, two base band signals having frequencies, each of which is equal to the frequency shift $\delta$, and also having orthogonal phases can be obtained from the low pass filters. These base band signals can be expressed as follows:

$$a(t)\cos(2\pi\delta t)$$

$$a(t)\cos(2\pi\delta t+\pi/2)=-a(t)\sin(2\pi\delta t)$$

where a(t) is the amplitude determined by an input voltage to the receiving device, the gain of the high frequency amplifier, and the characteristics of the mixers and the low pass filters.

The base band signals output from the low pass filters are respectively shaped by the low frequency amplifiers and the amplitude limiters to be supplied to the detector. In the detector, the signal level of one of the base band signals is sampled in synchronization with an edge of the other base band signal to determine the phase relationship between the two base band signals, and the polarity of the frequency shift $\delta$ is discriminated on the basis of the phase relationship. Assume that the signal level of a first base band signal is detected at the leading edge of a second base band signal, and the exclusive OR between the detected first base band signal and the second base band signal is "0". In this case, it is determined that the second base band signal is delayed with respect to the first base band signal. For example, it is discriminated on the basis of this phase relationship that the frequency shift $\delta$ is positive. In contrast to this, if the exclusive OR between the detected first base band signal and the second base band signal is "1", it is determined that the second base band signal is advanced with respect to the first base band signal. It is then discriminated on the basis of this phase relationship that the frequency shift $\delta$ is negative.

That is, this receiving device is designed to discriminate whether the frequency shift $\delta$ is positive or negative by utilizing zero-crossing points (leading or trailing edges) of two base band signals whose phases are shifted from each other by $\pi/2$.

However, in the above-described FSK signal receiving device, since zero-crossing points of two base band signals are utilized to discriminate whether the frequency shift $\delta$ is positive or negative, discrimination timings are limited to the positions of zero-crossing points of the two base bands, and discrimination cannot be performed at other positions. If, therefore, the data transmission rate is high as compared with the shifted frequency, especially when one slot of data corresponds to ½ the shifted frequency or less, a given data slot transits to the next slot before the next zero-crossing points of the first and second base band signals come. As a result, changes in codes of reception data cannot be detected sometimes. That is, data transmitted at a high transmission rate cannot be completely received sometimes, thus limiting the transmission rate of data.

In addition, in order to handle data transmitted at a high transmission rate, the frequency shift $\delta$ must be set to be large as compared with a modulation wave frequency fm (a frequency at which the frequency shift of a received FSK signal is switched between $+\delta$ and $-\delta$ and which corresponds to ½ the data transmission rate). This, however, requires a wide transmission band.

SUMMARY OF THE INVENTION

It is an object of the present invention to provide an FSK signal receiving device which can stably demodulate, without the omission of data, even an FSK signal modulated with a shifted frequency which is lower than a data transmission rate, thereby easily realizing an increase in data transmission rate and a decrease in transmission band.

It is another object of the present invention to provide an FSK signal receiving device which can stably demodulate, without the omission of data, an FSK signal modulated with a shifted frequency which is lower than a data transmission rate, thereby easily realizing an increase in data transmission rate and a decrease in transmission band, and obtaining high-quality reception data by increasing the signal-to-noise ratio of a detection signal.

It is still another object of the present invention to provide an FSK signal receiving device which can give a high-precision phase shift, without variations, to each base band signal, thereby improving reproducibility and reliability and easily achieving a reduction in size by integration.

It is still another object of the present invention to provide an FSK signal receiving device which can give a high-precision phase shift, without variations, to each base band, can achieve a reduction in size by further simplifying the circuit arrangement, and can decrease the power consumption.

According to the present invention, there is provided an FSK signal receiving device comprising a first phase shifting circuit for applying a first phase shift to a first base band signal of first and second reception base band signals having orthogonal phases to generate a third base band signal, and generating a fourth base band signal having a phase orthogonal to the phase of the third base band signal, a second phase shifting circuit for applying the first phase shift to the second base band signal to generate a fifth reception base band signal, and a detection signal generating circuit for performing an exclusive OR operation on the third and fourth base band signals to obtain a first output signal, on the third and fifth base signals to obtain a second output signal, and on the first and second output signals to generate a detection signal.

According to the present invention, there is provided an FSK signal receiving device comprising a first phase shifting circuit for generating a third base band signal, obtained by applying a first phase shift to a first base band signal of first and second reception base band signals having orthogonal phases, and a fourth base band signal having a phase orthogonal to a phase of the third base band signal, a second phase shifting circuit for generating a fifth base band signal, obtained by applying the first phase shift to the second base band signal, and a sixth base band signal having a phase orthogonal to a phase of the fifth base band signal, and a detection signal generating circuit for obtaining a first output signal by performing an exclusive OR operation on the third and fourth base band signals, generating a second output signal by performing an exclusive OR operation on the fifth and sixth base band signals, generating a third output signal by performing an exclusive OR operation on the third and fifth base band signals, generating a fourth output signal by performing an exclusive OR operation on the third and first output signals, generating a fifth output signal by performing an exclusive OR operation on the third and second output signals and generating a detection signal by synthesizing the fourth and fifth output signals.

In addition, according to the present invention, there is provided an FSK signal receiving device, wherein each of the first and second phase shifting circuits comprises a digital delay circuit having a delay time corresponding to the phase shift and gives the phase shift to each input base band signal by using the digital delay circuit.

Furthermore, according to the present invention, each of the first and second phase shifting circuits is designed to shape and convert each input base band signal into a binary signal by using a waveshaping circuit, and to delay the binary signal by a delay time corresponding to the phase shift by using a digital delay circuit.

According to the above-described present invention, since identification of data is not performed by using zero-crossing points of each base band signal but is continuously performed by using the entire waveform of each band signal, even if the modulation frequency of an FSK signal is not sufficiently lower than a frequency shift, i.e., a shifted frequency is not sufficiently lower than a data transmission rate, accurate, stable demodulation can be performed without causing the omission of data. Therefore, high-speed data transmission can be stably performed without increasing the frequency bandwidth.

In addition, according to the present invention, a detection output obtained by the first base band signal system, i.e., the fourth output signal, is added/synthesized to/with a detection output obtained by the second base band signal system, i.e., the fifth output signal, and the resulting output is used as a detection output. Therefore, the signal level of the detection output can be increased twice that of a detection signal obtained by using only one of the output signals, without increasing the noise level much. That is, according to the present invention, there is provided an FSK signal receiving device which can always perform accurate, stable demodulation without causing the omission of data even if a shifted frequency is not sufficiently lower than a data transmission rate, and can increase the signal-to-noise ratio of a detection output.

Furthermore, according to the present invention, since a digital delay circuit is used as a phase shifting circuit, and a phase shift is applied to an input base band signal through this digital delay circuit, a phase shift with small variations can be applied to an input base band signal as compared with a case wherein an analog phase shifter is used. In addition, since integration by, e.g., a CMOS process is facilitated, a compact, low-power-consumption circuit can be realized.

Moreover, according to the present invention, a waveshaping circuit for converting an input signal into a binary signal is used as a circuit for converting an analog base band signal into a digital signal. Therefore, no A/D converter is required. This further simplifies the circuit arrangement and achieve a reduction in power consumption.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram showing the arrangement of an FSK signal receiving device according to the second embodiment of the present invention;

FIG. 5 is a timing chart for explaining an operation of the receiving device shown in FIG. 4;

FIG. 6 is a graph showing the reception error rate characteristics of the receiving devices shown in FIGS. 1 and 4;

FIG. 12 is a block diagram showing the arrangement of the front-stage portion of an FSK signal receiving device according to the fifth embodiment of the present invention;

FIG. 14 is a block diagram showing an arrangement of a 2-bit delay circuit in the receiving device shown in FIG. 13; and FIG. 15 is a graph showing the low-frequency filtering characteristics of a digital filter in the receiving device shown in FIG. 13.

DETAILED DESCRIPTION OF THE PREFERRED EMBODIMENTS

Figure 1:
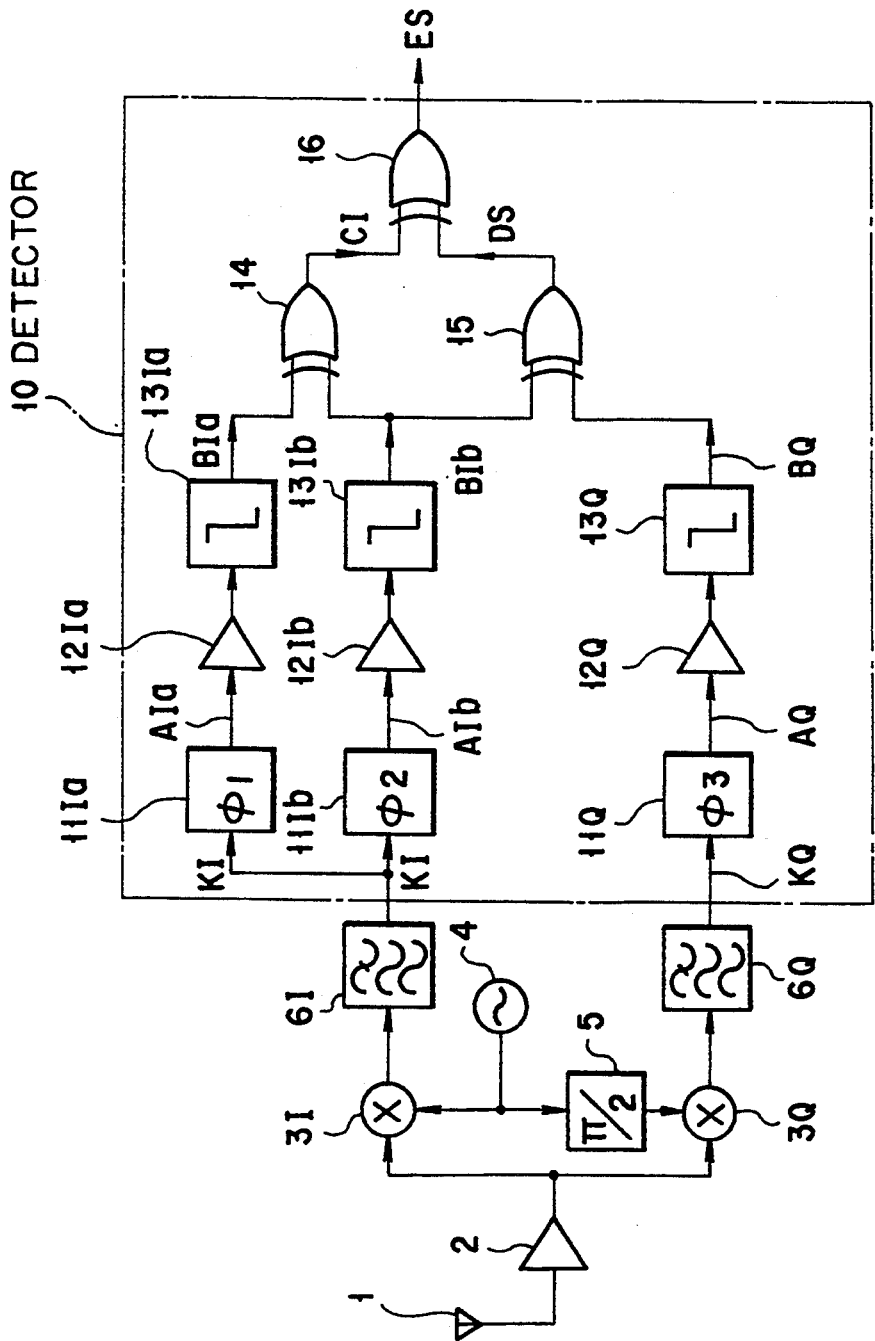
FIG. 1 is a block diagram showing the arrangement of an FSK signal receiving device according to the first embodiment of the present invention.

According to an FSK signal receiving device of the first embodiment shown in FIG. 1, an antenna 1 is connected to a high frequency amplifier 2 for amplifying a received FSK signal. The output terminal of the high frequency amplifier 2 is branched to be connected to mixers 3I and 3Q. These mixers 3I and 3Q respectively mix a received FSK signal with a local oscillation signal generated by a local oscillator 4 and a $\pi/2$-shifted local oscillation signal obtained by shifting the phase of the local oscillation signal by $\pi/2$ using a phase shifter 5, thus performing frequency conversion. The frequency of the local oscillation signal is set to be substantially equal to the carrier frequency of the received FSK signal. For this reason, the mixers 3I and 3Q directly output base band signals instead of intermediate frequency signals. That is, in the mixers 3I and 3Q, the received FSK signals are demodulated by a direct conversion system. The FSK demodulated signals output from the mixers 3I and 3Q are respectively input to low pass filters 6I and 6Q to remove their high-frequency components.

First and second base band signals KI and KQ output from the low pass filters 6I and 6Q are input to a detector 10. The detector 10 is constituted by a first phase shifting circuit for applying a predetermined phase shift to the first base band signal KI, a second phase shifting circuit for applying a predetermined phase shift to the second base band signal KQ, and a multiplying circuit.

In the first phase shifting circuit section, the first base band signal KI is branched such that one of the signals is input to a first phase shifter 111a to have a phase shift $\phi 1$. A first branch base band signal AIa having the phase shift $\phi 1$ is shaped into a rectangular wave by a low frequency amplifier 12Ia and an amplitude limiter 13Ia. The other signal branched from the first base band signal KI is input to a second phase shifter 111b to have a phase shift $\phi 2$. A first branch base band signal AIb having the phase shift $\phi 2$ is shaped into a rectangular wave by a low frequency amplifier 12Ib and an amplitude limiter 13Ib.

In the second phase shifting circuit section, the second base band signal KQ is input to a third phase shifter 11Q to have a phase shift $\phi 3$. A second base band signal AQ having the phase shift $\phi 3$ is shaped into a rectangular wave by a low frequency amplifier 12Q and an amplitude limiter 13Q.

Each of the phase shifters 11Ia, 11Ib, and 11Q is constituted by an analog phase shifter obtained by connecting a capacitor and a resistor in an "L" shape. The phase shifts $\phi 1$, $\phi 2$, and $\phi 3$ are set to have the following relationships:

$$|\phi 1 - \phi 2| = \pi/2$$

$$|\phi 2 - \phi 3| = 0 \qquad (1)$$

The multiplying circuit includes three exclusive OR circuits 14, 15, and 16 as multipliers. The exclusive OR circuit 14 calculates the exclusive OR between signals BIa and BIb respectively output from the amplitude limiters 13Ia and 13Ib. The exclusive OR circuit 15 calculates the exclusive OR between the signals respectively output from the amplitude limiters 13Ib and 13Q. The exclusive OR circuit 16 calculates the exclusive OR between the signals respectively output from the exclusive OR circuits 14 and 15 and outputs the resulting value as a detection signal ES.

An operation of the receiving device having the above-described arrangement will be described next.

Since a local oscillation signal frequency fL generated by the local oscillator 4 is set to be substantially equal to a carrier wave fc of a received FSK signal, the base band signals KI and KQ containing only frequency shift δ components as fundamental frequency components can be obtained from the low pass filters 6I and 6Q. These base band signals KI and KQ are represented as follows:

$$KI = \cos(2\pi\delta t)$$

$$KQ = q\sin(2\pi\delta t) \qquad (2)$$

Assume that the second base band signal KQ is positive (+) when the code of transmission data is "0", and that the signal KQ is negative (−) when the code of transmission data is "1". Note that the amplitude coefficient of each base band signal is omitted in equations (2) for the sake of descriptive convenience.

The predetermined phase shifts $\phi 1$, $\phi 2$, and $\phi 3$ are applied to these base band signals KI and KQ by the phase shifters 11Ia, 11Ib, and 11Q of the detector 10 to generate the base band signals AIa, AIb, and AQ represented by the following equations:

$$AIa = \cos(2\pi\delta t + \phi 1)$$

$$AIb = \cos(2\pi\delta t + \phi 2)$$

$$AQ = \pm\sin(2\pi\delta t + \phi 3) \quad (3)$$

The following equation (4) is established from equation (1):

$$\phi 3 = \phi 2 = \pi/2 + \phi 1 \qquad (4)$$

Therefore, the base band signals AIa, AIb, and AQ can be represented by the following equations:

$$Ala = \cos(2\pi\delta t + \phi 1)$$

$$Alb = \cos(2\pi\delta t + \pi/2 + \phi 1)$$

$$= -\sin(2\pi\delta t + \phi 1)$$

$$AQ = \pm\sin(2\pi\delta t + \pi/2 + \phi 1)$$

$$= \pm\cos(2\pi\delta t + \phi 1) \qquad (5)$$

Figure 2:
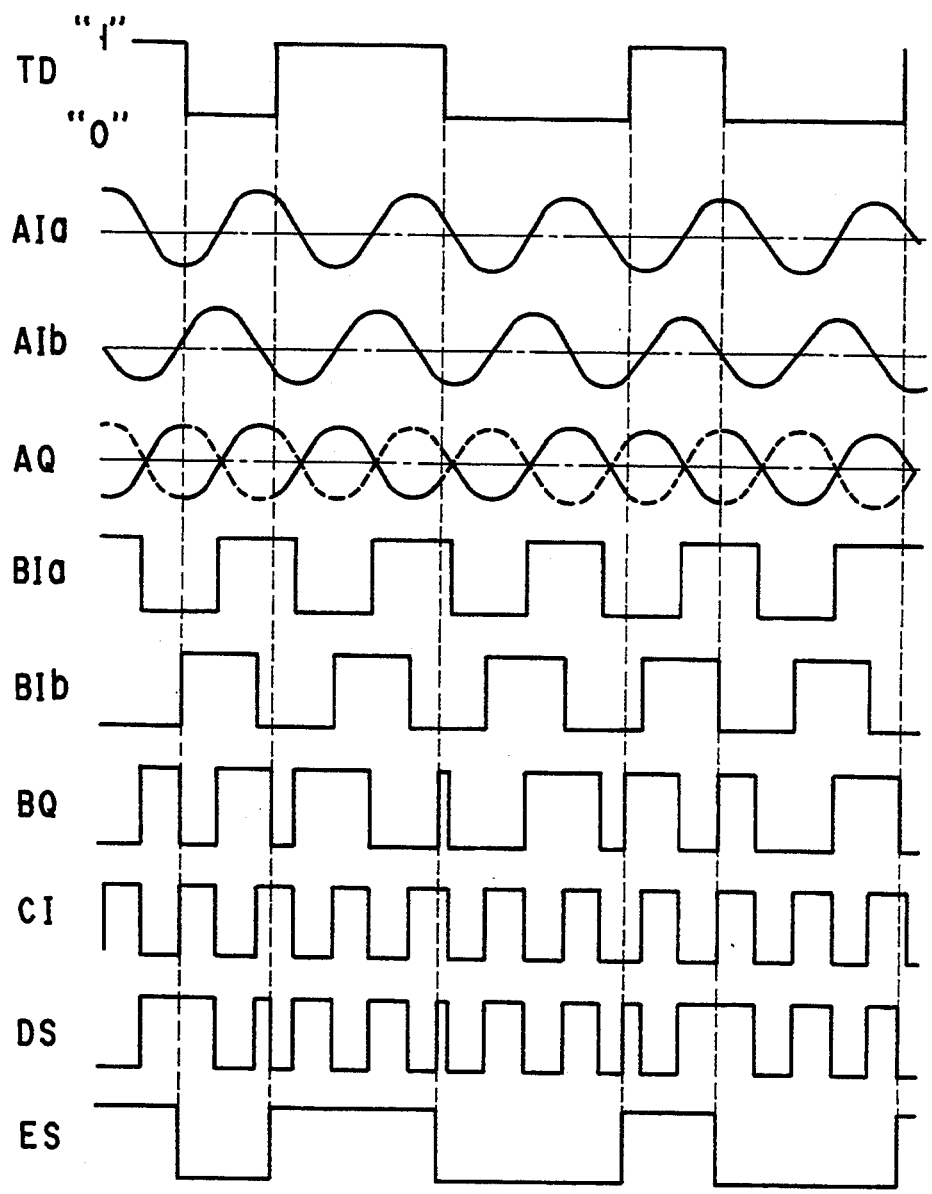
FIG. 2 is a timing chart for explaining an operation of the receiving device shown in FIG. 1.

If, for example, transmission data TD in FIG. 2 is transmitted upon FSK modulation, the base band signals AIa, AIb, and AQ having the waveforms shown in FIG. 2 are respectively output from the phase shifters 111a, 111b, and 11Q, as is apparent from equations (5). These base band signals AIa, AIb, and AQ are respectively shaped into rectangular waves BIa, BIb, and BQ shown in FIG. 2 by the low frequency amplifiers and the amplitude limiters. The base band signals BIa, BIb, and BQ as the rectangular waves are input to the exclusive OR circuits 14 and 15, so that the exclusive OR between the signals BIa and BIb and the exclusive OR between the signals BIb and BQ are respectively calculated to form signals CI and DS shown in FIG. 2. Furthermore, the exclusive OR between the signals CI and DS is calculated by the exclusive OR circuit 16. As a result, reception data ES shown in FIG. 2 is obtained.

As described above, in the FSK signal receiving device of this embodiment, the signal KI of the two base band signals KI and KQ having orthogonal phases is branched, and the phase shifts $\phi 1$ and $\phi 2$ having a phase difference $\pi/2$ are respectively given to the two branch signals, while the phase shift $\phi 3$ equal to the phase shift $\phi 2$ is given to the base band signal KQ. Thereafter, the base band signals BIa, BIb, and BQ respectively having the phase shifts $\phi 1$, $\phi 2$, and $\phi 3$ are exclusive-ORed in such a manner that the exclusive OR between the signals BIa and BIb and the exclusive OR between the signals BIb and BQ are respectively calculated. In addition, the exclusive OR between the exclusive OR outputs is calculated to obtain the detection signal ES. With this operation, transmission data is detected by using the entire waveform of each received base band signal. Consequently, even if a modulation wave frequency fm (a frequency at which the frequency shift of a received FSK signal is switched between $+\delta$ and $-\delta$ and which corresponds to ½ the data transmission rate) is high as compared with the frequency shift $\delta$, stable detection of transmission data can always be performed without the omission of data. Therefore, the receiving device can be satisfactorily used in a high-speed transmission system in which detection cannot be satisfactorily performed by a conventional circuit using zero-crossing points. In addition, since the frequency shift $\delta$ need not be increased, a wide transmission band is not required. These effects are very advantageous to a mobile radio communication system such as a vehicle or portable radio telephone system in which an increase in transmission rate and a decrease in radio channel intervals are required to comply with a recent increase in number of subscribers.

Figure 3:
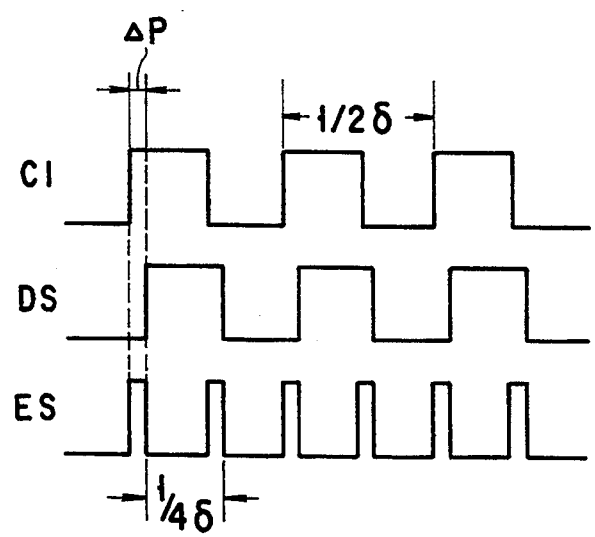
FIG. 3 is a timing chart for explaining the effects of the receiving device shown in FIG. 1.

According to the FSK signal receiving device of the embodiment, the following effect can also be obtained. The above description is made on the assumption that the phase shift amounts given by the phase shifters 111a, 111b, and 11Q are accurately set, and the low frequency amplifiers 121a, 121b, and 12Q and the amplitude limiters 131a, 131b, and 13Q respectively have the same characteristics. In practice, however, the above-mentioned phase shift amounts and characteristics include some deviations. For this reason, a phase deviation occurs between the base band signals CI and DS respectively output from the exclusive OR circuits 14 and 15, as shown in, e.g., FIG. 3. This deviation appears as impulse-like noise in the detection output ES output from the exclusive OR circuit 16, as shown in FIG. 3. In the circuit of this embodiment, however, since the fundamental frequency of each of the base band signals CI and DS immediately before detection is set to be $2\delta$, the above-mentioned impulse-like noise appearing in the detection output ES has a relatively high fundamental frequency, $4\delta$. Therefore, this noise can be relatively easily and effectively removed by a low pass filter (not shown) designed to remove high-frequency components and arranged on the output side. In this case, since the base band signals CI and DS greatly differ in frequency from the noise, these base band signals are not attenuated by the low pass filter.

The second embodiment of the present invention will be described below with reference to FIG. 4. The same reference numerals in FIG. 4 denote the same parts as in FIG. 1, and a detailed description thereof will be omitted.

The receiving device of the second embodiment is different from that of the first embodiment in the following point. In a detector 20, similar to the first base band signal system, the second base band signal system branches a signal KQ into two signals, applies predetermined phase shifts to the signals, respectively, and performs an exclusive OR operation on the signals. In addition, the detection signal obtained by the second base band signal system is synthesized with the detection output obtained by the first base band signal system to obtain a detection signal.

More specifically, the second base band signal KQ output from a low pass filter 6Q is branched to be input to third and fourth phase shifters 11Qa and 11Qb. Similar to first and second phase shifters 111a and 111b, these third and fourth phase shifters 11Qa and 11Qb are constituted by analog phase shifters, each obtained by connecting a capacitor and a resistor in an "L" shape. In the third and fourth phase shifters 11Qa and 11Qb, phase shifts $\phi 3$ and $\phi 4$ are respectively applied to the second base band signals KQ. In this case, the phase shifts $\phi 3$ and $\phi 4$ and phase shifts $\phi 1$ and $\phi 2$ applied to the first base band signal in the first and second phase shifters 111a and 111b are set to have the following relationships:

$$|\phi 1-\phi 2|=\pi/2$$

$$|\phi 2-\phi 3|=0$$

$$|\phi 3-\phi 4|=\pi/2 \qquad (6)$$

Signals AQa and AQb output from the third and fourth phase shifters 11Qa and 11Qb are respectively shaped into rectangular waves by a circuit constituted by low frequency amplifiers 12Qa and 12Qb and amplitude limiters 13Qa and 13Qb.

In addition, the detector 20 includes five exclusive OR circuits 14 to 18 constituting a multiplying circuit, and one subtracter 19. Of the exclusive OR circuits 14 to 18, the circuit 14 performs an exclusive OR operation on signals BIa and BIb respectively output from the amplitude limiters 131a and 131b. The exclusive OR circuit 15 performs an exclusive OR operation on the signals respectively output from the amplitude limiters 13I*b* and 13Q. Furthermore, the exclusive OR circuit 16 performs an exclusive OR operation on the signals respectively output from the exclusive OR circuits 14 and 15, and outputs the resulting output signal as a detection signal ES from the first base band signal. The exclusive OR circuit 17 performs an exclusive OR operation on the signals BQa and BQb respectively output from the amplitude limiters 13Q*a* and 13Q*b*. In addition, the exclusive OR circuit 18 performs an exclusive OR operation on the signal output from the exclusive OR circuit 17 and the exclusive OR signal based on the signals BI*b* and BQa output from the exclusive OR circuit 15, and outputs the resulting output signal as a detection signal FS from the second base band signal system.

The subtracter 19 subtracts the detection signal FS, output from the exclusive OR circuit 18, from the detection signal ES, output from the exclusive OR circuit 16. A low pass filter 21 extracts only low frequency components from the signal output from the subtracter 19. Thereafter, the resulting signal is shaped into a rectangular wave by a circuit constituted by a low frequency amplifier 22 and an amplitude limiter 23. The rectangular wave signal is then output as a detection signal HS from the receiving device of this embodiment.

With this arrangement, since a local oscillation signal frequency fL generated by a local oscillator 4 is set to be substantially equal to a carrier frequency fc of a received FSK signal, base band signals KI and KQ containing only frequency shift δ components as fundamental frequency components can be respectively obtained from low pass filters 6I and 6Q. These base band signals KI and KQ are represented as follows, as has been indicated by equation (2):

$$KI = \cos(2\pi\delta t)$$

$$KQ = \pm\sin(2\pi\delta t)$$

Each of the base band signals KI and KQ is branched in two directions by the detector 20. Subsequently, predetermined phase shifts $\phi 1$, $\phi 2$, $\phi 3$, and $\phi 4$ are respectively applied to the branch signals by the phase shifters 11I*a*, 11I*b*, 11Q*a*, and 11Q*b*. As a result, the phase shifters 11I*a*, 11I*b*, 11Q*a*, and 11Q*b* respectively output base band signals AIa, AIb, AQa, and AQb represented by the following equations:

$$AIa = \cos(2\pi\delta t + \phi 1)$$

$$AIb = \cos(2\pi\delta t + \phi 2)$$

$$AQa = \pm\sin(2\pi\delta t + \phi 3)$$

$$AQb = \pm\sin(2\pi\delta t + \phi 4) \quad (7)$$

From equations (6), the phase shifts $\phi 1$, $\phi 2$, $\phi 3$, and $\phi 4$ are represented as follows:

$$\phi 3 = \phi 2$$

$$\phi 4 = \phi 1$$

$$\phi 2 = \pi/2 + \phi 1 \quad (8)$$

Therefore, the base band signals AIa, AIb, AQa, and AQb are represented as follows:

$$AIa = \cos(2\pi\delta t + \phi 1)$$

$$AIb = -\sin(2\pi\delta t + \phi 1)$$

$$AQa = \pm\cos(2\pi\delta t + \phi 1)$$

$$AQb = \pm\sin(2\pi\delta t + \phi 1) \quad (9)$$

Assume that transmission data TD in FIG. 5 is transmitted from a transmission office upon FSK modulation. In this case, the base band signals AIa, AIb, AQa, and AQb having the waveforms shown in FIGS. 2 and 5 are respectively output from the phase shifters 11I*a*, 11I*b*, 11Q*a*, and 11Q*b*. These base band signals AIa, AIb, AQa, and AQb are respectively shaped into the rectangular wave signals BIa, BIb, BQa, and BQb shown in FIGS. 2 and 5 by the low frequency amplifiers and the amplitude limiters. The rectangular wave base band signals BIa, BIb, BQa, and BQb are exclusive-ORed by the exclusive OR circuits 14, 15, and 17 in such a manner that the exclusive OR operation on the signals BIa and BIb, the exclusive OR operation on the signals BIb and BQa, and the exclusive OR operation on the signals BQa and BQb are respectively performed to obtain signals CI, DS, and CQ having the waveforms shown in FIGS. 2 and 5. Furthermore, the exclusive OR operation on the signals CI and DS and the exclusive OR operation on the signals CQ and DS are respectively performed by the exclusive OR circuits 16 and 18. As a result, the detection signals ES and FS shown in FIGS. 2 and 5 can be obtained. These detection signals ES and FS are subtracted from each other by the subtracter 19. In this case, since the detection signals ES and FS have opposite polarities, they are added together upon subtraction processing. As a result, the subtracter 19 outputs a detection signal GS having a signal level twice as high as the signal level of the signal ES or FS, as shown in FIG. 5. The low pass filter 21 removes unnecessary high-frequency components from the detection signal GS. The resulting signal is then shaped by the low frequency amplifier 22 and the amplitude limiter 23. The shaped signal is output as a detection signal HS from the receiving device of this embodiment.

As described above, in the FSK signal receiving device of this embodiment, each of the two base band signals KI and KQ having orthogonal phases is branched, and the phase shifts $\phi 1$, $\phi 2$, $\phi 3$, and $\phi 4$ having a phase difference $\pi/2$ are respectively applied to the branch signals to obtain the base band signals BIa, BIb, BQa, and BQb. Exclusive OR operations on the signals BIa and BIb, on the signals BIb and BQa, and on the signals BQa and BQb are respectively performed to obtain the exclusive OR outputs CI, DS, and CQ. Subsequently, exclusive OR operations on the signals CI and DS, and on the signals CQ and DS are performed. The resulting exclusive OR outputs ES and FS are subtracted from each other by the subtracter 19 to obtain the detection signal GS.

With this operation, therefore, in the second embodiment, similar to the first embodiment, detection of transmission data is performed by using the entire waveform of each received base band signal. Consequently, even if a modulation wave frequency fm is high as compared with the frequency shift δ, stable detection of transmission data can always be performed without the omission of data. Therefore, the receiving device can be satisfactorily used in a high-speed transmission system in which detection cannot be satisfactorily performed by a conventional circuit using zero-crossing points. In addition, since the frequency shift δ need not be increased, a wide transmission band is not required.

In addition, according to the second embodiment, since the detection signal FS, obtained by the second base band signal system, is subtracted from the detection signal ES, obtained by the first base band signal system, to obtain the detection signal GS, the amplitude of the detection signal GS is twice as high as that of the single detection signal ES or FS. In this case, since noise components contained in the detection signals ES and FS have no correlation, the noise level is not doubled upon subtraction processing. Therefore, the detection signal GS obtained by the subtraction processing has a signal-to-noise ratio (S/N) higher than that of the single detection signal ES or FS. That is, high-quality reception data can be obtained.

FIG. 6 shows the reception error rate characteristics calculated by simulation to prove the validity of the receiving devices of the first and second embodiments. Referring to FIG. 6, a curve a represents the reception error rate characteristics of the receiving device (FIG. 1) of the first embodiment, and a curve b represents the reception error rate characteristics of the receiving device (FIG. 4) of the second embodiment. Note that a curve c represents the reception error rate characteristics of the conventional receiving device. As is apparent from these characteristic curves, excellent detection characteristics can be ensured by the receiving device of each embodiment of the present invention as compared with the conventional device.

Figure 7:
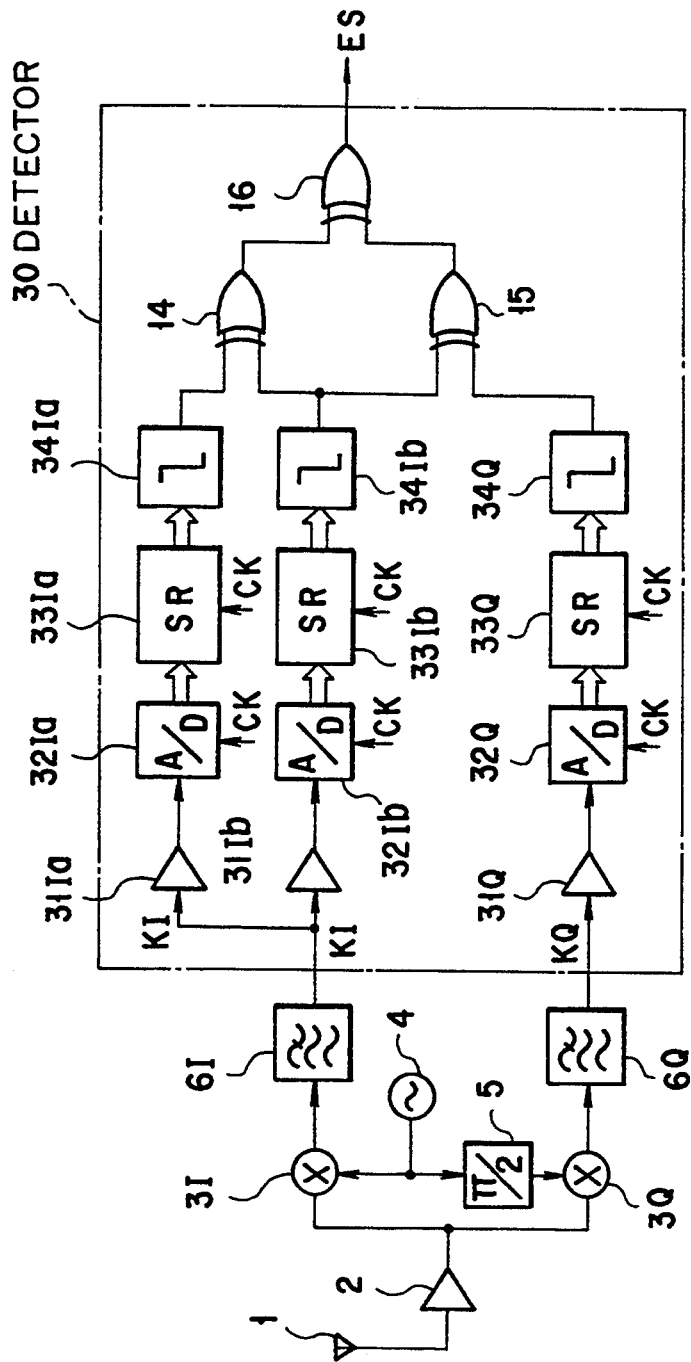
FIG. 7 is a block diagram showing the arrangement of an FSK signal receiving device according to the third embodiment of the present invention.

The third embodiment of the present invention will be described below with reference to FIG. 7. The same reference numerals in FIG. 7 denote the same parts as in FIG. 1, and a detailed description thereof will be omitted, The receiving device of this embodiment is different from that shown in FIG. 1 in that each phase shifting section of a detector 30 is constituted by an analog digital converter (A/D) and a digital delay circuit using a shift register.

More specifically, a first base band signal KI output from a low pass filter 6I is branched to be input to A/D converters 32Ia and 32Ib through low frequency amplifiers 31Ia and 31Ib. The two input signals are respectively converted into digital signals by the A/D converters 32Ia and 32Ib. The digital signals are delayed by predetermined periods of time fixed in advance in shift registers (SR) 33Ia and 33Ib. Thereafter, the polarity data of the signals are respectively detected by digital comparators 34Ia and 34Ib. Similarly, a second base band signal KQ output from a low pass filter 6Q is converted into a digital signal by an A/D converter 32Q through a low frequency amplifier 31Q. The digital signal is delayed by a predetermined period of time fixed in advance in a shift register (SR) 33Q. The polarity data of the signal is then detected by a digital comparator 34Q.

Each of the shift registers 33Ia, 33Ib, and 33Q is constituted by, e.g., cascade-connected N D-flip-flops. The above-mentioned delay times are determined by D-flip-flop counts N and a period T of a shift clock signal CK supplied to the shift registers 33Ia, 33Ib, and 33Q. For example, if the average frequency of a signal output from the low pass filters 6I and 6Q is represented by f, D-flip-flop counts N1, N2, and N3 of the shift registers 33Ia, 33Ib, and 33Q are set as follows:

$$N1 - N2 = \tfrac{1}{4} fT$$

$$N2 - N3 = 0$$

Note that the value T is set such that 1/T is equal to or more than twice the maximum frequency contained in the signal output from the low pass filters 6I and 6Q.

With this arrangement, since each phase shifting section is constituted by an A/D converter and a digital delay circuit using a shift register and having a fixed delay amount, variations in phase shift between the respective phase shifting sections are reduced, thus constituting a detector having high reproducibility and reliability. In addition, since the digital circuits are used, the detector can be integrated to a high degree by using CMOS, realizing a circuit with very low power consumption.

In contrast to this, an analog phase shifter using a capacitor and a resistor is based on the fact that the phase difference between a high pass filter (HPF) and a low pass filter (LPF) having the same cutoff frequency is π/2. For this reason, the attenuation amount of an input signal varies depending on its frequency. Therefore, signals in a frequency band with large attenuation amounts must be amplified to their original signal levels or more, resulting in an increase in number of amplification stages. Furthermore, since such amplification is not allowed to have phase shift characteristics which may influence the phase shift amount of the phase shifter, gain characteristics inevitably become flat. In this case, signals in a frequency band with small attenuation amounts may be excessively amplified, causing saturation of the amplifier. If the amplifier is saturated before the amplitude limiter, offset due to distortion occurs, and a proper amplitude limiting operation cannot be performed. In addition, since signals in the frequency band with small attenuation amounts are amplified to their original signal levels or more, the S/N ratio is decreased. Moreover, since the absolute precision of resistor and capacitor elements which can be realized in an integrated circuit is several tens %, the phase shift amount tend to greatly vary among the phase shifters.

Figure 8:
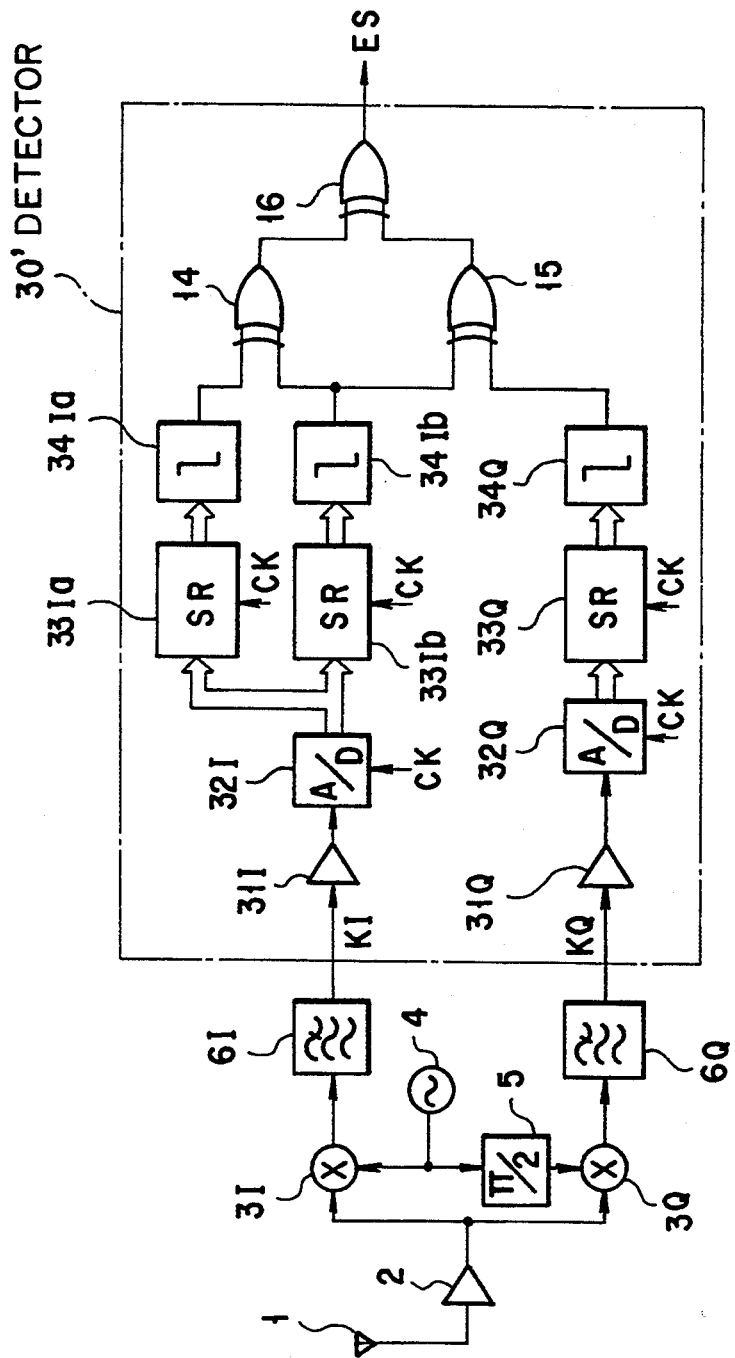
FIG. 8 is a block diagram showing a modification of the receiving device shown in FIG. 7.

The detector 30 of this embodiment can be modified as follows. As shown in FIG. 8, for example, a detector 30' is designed such that a base band signal KI output from a low pass filter 6I is converted into a digital signal by an A/D converter 32I through a low frequency amplifier 31I, the digital signal is branched into two signals, and one signal is input to a shift register 33Ia, while the other signal is input to a shift register 33Ib. With this arrangement, the number of low frequency amplifiers and that of A/D converters can be respectively decreased by one as compared with the circuit shown in FIG. 7. Accordingly, the circuit arrangement can be simplified.

Figure 9:
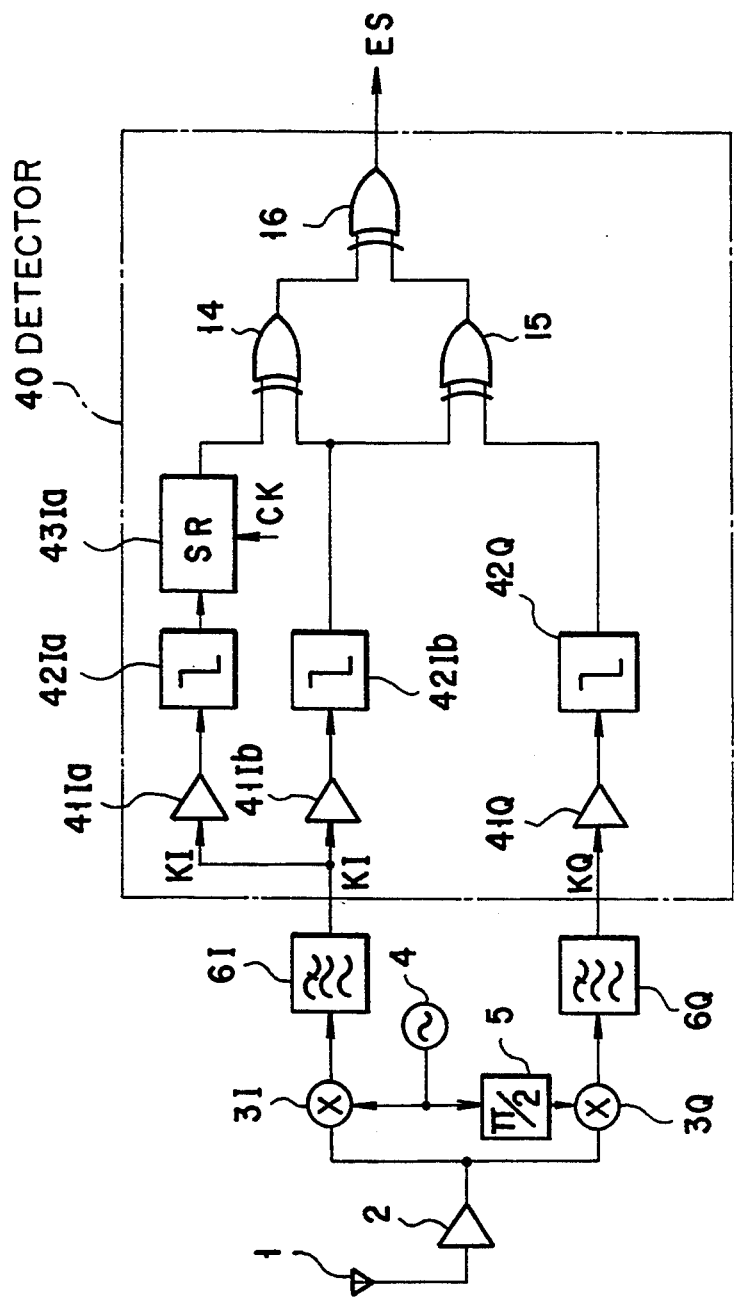
FIG. 9 is a block diagram showing the arrangement of an FSK signal receiving device according to the fourth embodiment of the present invention.

The fourth embodiment of the present invention can be described below with reference to FIG. 9. The same reference numerals in FIG. 9 denote the same parts as in FIG. 8, and a detailed description thereof will be omitted.

A detector 40 of the fourth embodiment is designed in consideration of the facts that the same data can be obtained either by performing an amplitude limiting operation using an amplitude limiter after amplifying an output from a phase shifter or by performing a phase shifting operation using a phase shifter after performing an amplitude limiting operation, and an output signal from an amplitude limiter can be processed as a binary signal. That is, a phase shifter constituted by a shift register is arranged after a waveshaping circuit constituted by a low frequency amplifier and an amplitude limiter.

More specifically, a first base band signal KI output from a low pass filter 6I is branched into two signals. The two signals are respectively shaped into binary signals by waveshaping circuits constituted by low frequency amplifiers 41Ia and 41Ib and amplitude limiters 42Ia and 42Ib. A second base band signal KQ output from a low pass filter 6Q is shaped into a binary signal by a waveshaping circuit constituted by a low frequency amplifier 41Q and an amplitude limiter 42Q. Of these binary signals, only the signal output from the amplitude limiter 42Ia is input to a shift register (SR) 43Ia to be delayed by a predetermined period of time.

The shift register 43Ia is constituted by, e.g., cascade-connected N D-flip-flops. The delay time of the shift register 43Ia is determined by a D-flip-flop count N and the period of a shift clock signal CK. Assume that the base band signal KI output from the low pass filter 6I has an average frequency f. In this case, in order to delay a signal having the frequency f by a period of time corresponding to a phase shift amount $\pi/2$, if the period of the shift clock CK is represented by T, the D-flip-flop count N may be set as follows:

$$N = \tfrac{1}{4} fT$$

Note that since the period T of the shift clock CK corresponds to the sampling period of a 1-bit A/D converter, 1/T must be set to be equal to or more than twice the maximum frequency contained in the output signal from the low pass filter 6I.

With this arrangement, one of the first base band signals KI is shaped into a binary signal by the low frequency amplifier 41Ia and the amplitude limiter 42Ia and is delayed by a period of time corresponding to $N = \tfrac{1}{4} fT$ through the shift register 43Ia. As a result, the phase of the first base band signal KI is equivalently shifted by $\pi/2$. Therefore, signals equivalent to the signals BIa, BIb, and BQ shown in FIG. 2 are input to exclusive OR circuits 14, 15, and 16. Subsequently, detection of transmission data is performed by using the entire waveform of each received base band signal. Note that, in the circuit of this embodiment, of all the frequency components of an input base band signal, phase shifts deviated from $\pi/2$ are applied to frequency components except for components having the frequency f, but the influence of such a phase shifting operation on the error rate is small. Therefore, high-quality detection with less variation can be performed as compared with a case wherein an analog phase shifter constituted by a capacitor and a resistor is used.

Since a shift register is used as a phase shifter, integration of the circuit is facilitated, and a reduction in power consumption can be achieved. In addition, since the function of an A/D converter is realized by an amplitude limiter designed to obtain a binary signal, i.e., a simple amplitude comparator, no A/D converter is required. With this arrangement, in this embodiment, the circuit size can be greatly and easily reduced as compared with the third embodiment. Furthermore, since a great reduction in required circuit precision can be achieved, a detector having high reproducibility and reliability can be obtained even with a manufacturing process for CMOS or the like, in which high precision is relatively difficult to ensure.

In the third and fourth embodiments, each phase shifter is constituted by a digital delay circuit having a predetermined delay time. With such a circuit, since a constant delay amount is set, if the frequency of an input signal deviates from a desired frequency, required phase shift characteristics may not be obtained. It is considered that the main factor that causes a frequency deviation from a desired frequency is frequency offset of a local oscillator, which causes a base band signal to offset from the desired frequency after frequency conversion. However, even if such a frequency deviation occurs, the receiving devices of the third and fourth embodiments can be used without any practical problems.

Figure 10:
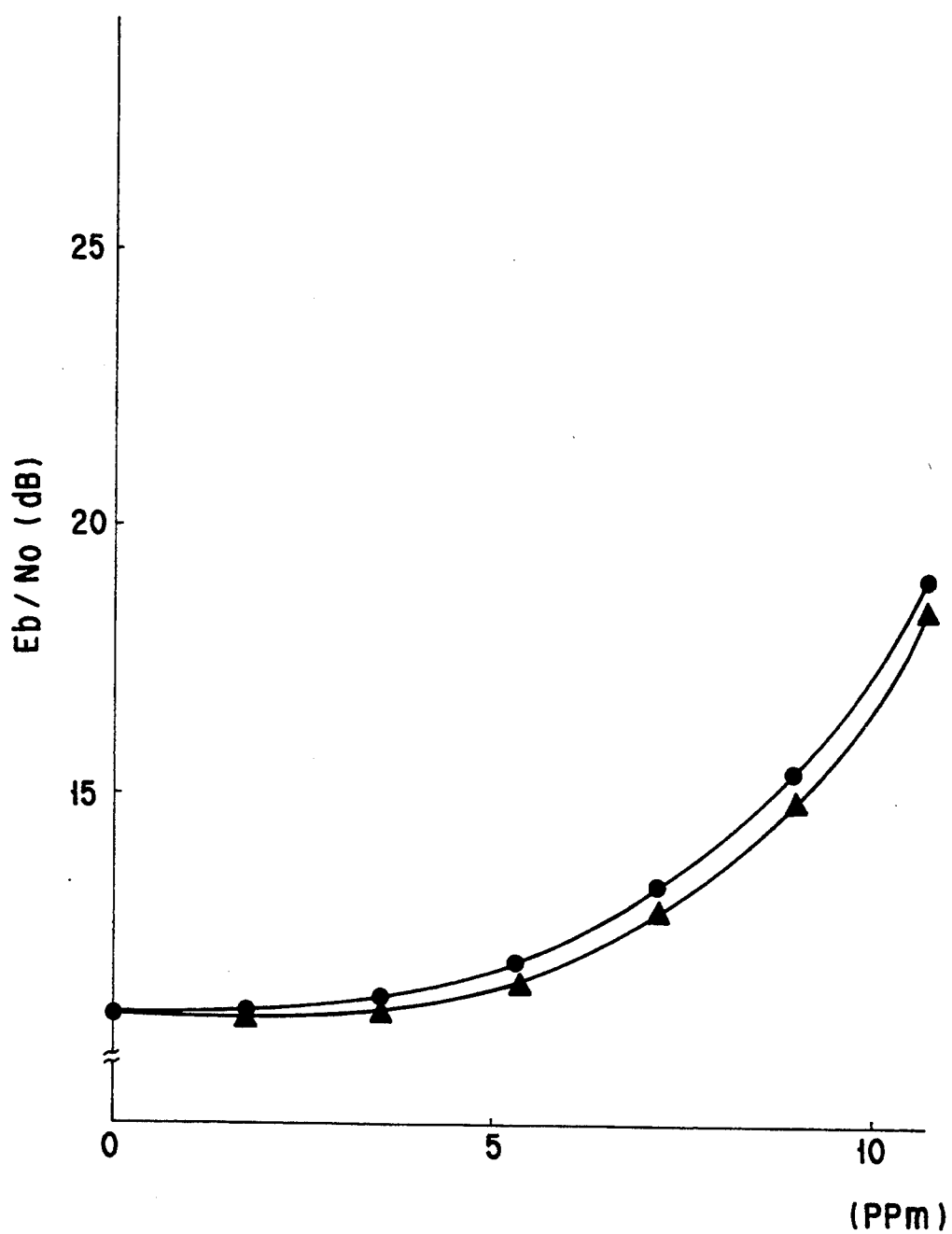
FIG. 10 is a graph showing the relationship between the frequency offset of a local oscillator and the value Eb/No for obtaining a predetermined reception error rate.

Referring to FIG. 10, curves d and e respectively represent the relationships between the frequency offset of the local oscillator 4 and the value Eb/No for obtaining a predetermined reception error rate (10-2), which are obtained by numerical calculations in both cases in which an analog phase shifter constituted by a capacitor and a resistor and a digital phase shifter having a predetermined delay time are used. A frequency deviation caused in a VHF-band receiving device by the temperature characteristics and the like of a local oscillator is normally about 5 ppm. It is apparent from FIG. 10 that, at a frequency deviation of about 5 ppm, even if the digital delay circuit having a predetermined delay time is used, substantially no deterioration in detection sensitivity occurs as compared with the case wherein the analog phase shifter is used. Therefore, even if a digital delay circuit having a predetermined delay time is used as a phase shifter as in the receiving devices of the third and fourth embodiments (FIGS. 7 and 9), FSK signals can be properly detected.

Figure 11:
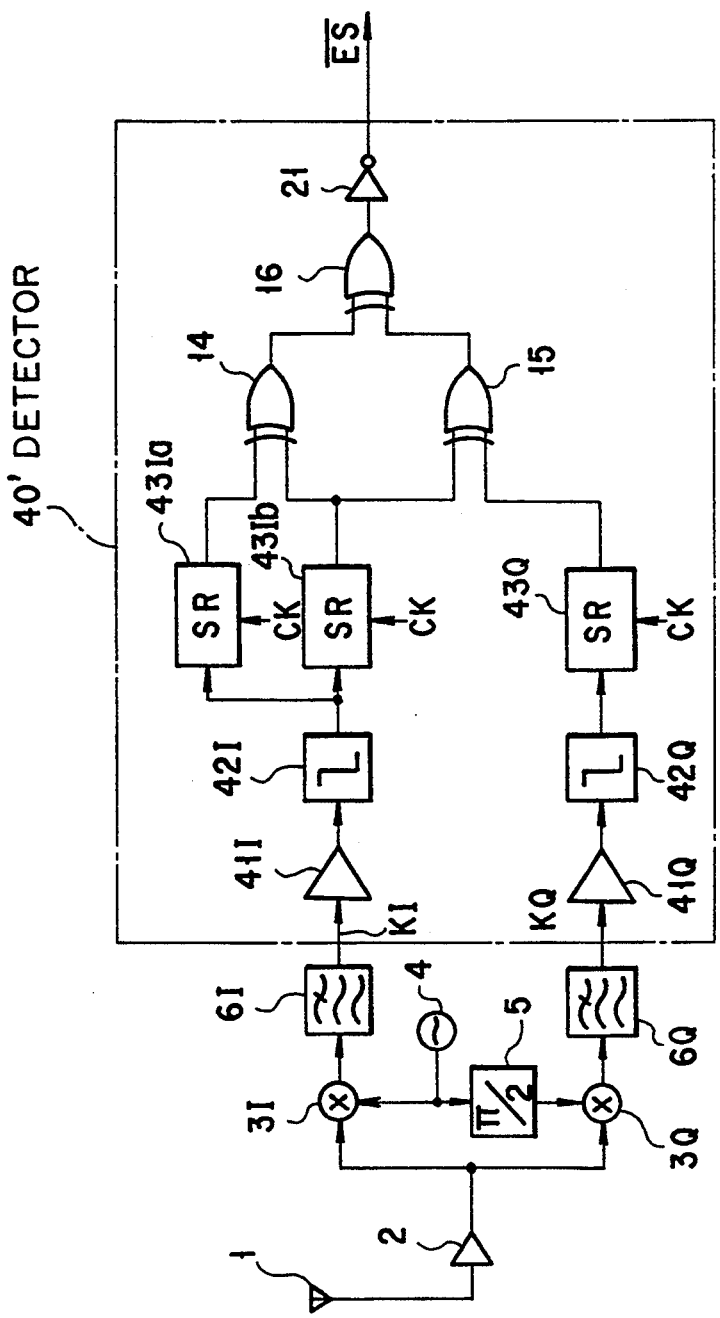
FIG. 11 is a block diagram showing a modification of the receiving device shown in FIG. 9.

The detector 40 of this embodiment can be modified as follows. As shown in FIG. 11, a base band signal KI output from a low pass filter 6I is shaped by a low frequency amplifier 41I and an amplitude limiter 42I and is subsequently branched to be input to shift registers 43Ia and 43Ib. The two branch signals are respectively delayed by predetermined amounts through the shift registers 43Ia and 43Ib. The delayed signals are exclusive-ORed by an exclusive OR circuit 14. Meanwhile, a base band signal KQ output from a low pass filter 6Q is shaped by a low frequency amplifier 41Q and an amplitude limiter 42Q and is input to a shift register 43Q. The phase of the base band signal KQ is delayed by a predetermined amount through the shift register 43Q. The resulting signal is then input to an exclusive OR circuit 15. The exclusive OR circuit 15 performs an exclusive OR operation on the delayed signal and the signal output from the shift register 43Ib. An exclusive OR circuit 16 performs an exclusive OR operation on the signals respectively output from the exclusive OR circuits 14 and 15 to obtain a detection signal ES. An inverter 21 logically inverts this detection signal ES and outputs the inverted signal.

With this arrangement, in the first base band signal system, the number of waveshaping circuits, each comprising a low frequency amplifier and an amplitude limiter, can be reduced from two to one, thus simplifying the circuit arrangement. In addition, since the shift registers 43Ia, 43Ib, and 43Q are arranged for the respective signal systems, a delay amount with respect to each base band can be set with a certain degree of freedom.

The fifth embodiment of the present invention will be described below with reference to FIGS. 12 and 13. The same reference numerals in FIGS. 12 and 13 denote the same parts as in FIG. 11, and a detailed description thereof will be omitted.

The receiving device of the fifth embodiment is different from that of the fourth embodiment in the following manner. In a detector 50, similar to the first base band signal system, the second base band signal system branches a signal KQ into two signals, delays the signals by predetermined periods of time, respectively, and performs an exclusive OR operation on the signals. In addition, the detection signal obtained by the second base band signal system is synthesized with the detection output obtained by the first base band signal system to obtain a detection signal.

More specifically, a first base band signal KI output from a low pass filter 6I is shaped by low frequency amplifiers 41I and 41Q and amplitude limiters 42I and 42Q and is subsequently branched to be input to first and second shift registers 43I$a$ and 43I$b$. Similarly, a second base band signal KQ output from a low pass filter 6Q is shaped by the low frequency amplifiers 41I and 41Q and the amplitude limiters 42I and 42Q and is subsequently branched to be input to third and fourth shift registers 43Q$a$ and 43Q$b$. D-flip-flop counts N1 to N4 of the first to fourth shift registers 43I$a$, 43I$b$, 43Q$a$, and 43Q$b$ are set to have the following relationships:

$$N1-N2 = \tfrac{1}{4}fT$$

$$N2-N3 = 0$$

$$N4-N3 = \tfrac{1}{4}fT$$

The base band signals respectively output from the shift registers 43I$a$ and 43I$b$ are exclusive-ORed by an exclusive OR circuit 14. The resulting signal is input to an exclusive OR circuit 16. Meanwhile, the base band signals respectively output from the shift registers 43Q$a$ and 43Q$b$ are exclusive-ORed by an exclusive OR circuit 17. The resulting signal is input to an exclusive OR circuit 18. In addition, the base band signals respectively output from the shift registers 43I$b$ and 43Q$a$ are exclusive-ORed by an exclusive OR circuit 15, and the resulting signal is input to the exclusive OR circuits 16 and 18. The exclusive OR circuit 16 performs an exclusive OR operation on the output signals from the exclusive OR circuits 14 and 15. An output signal ES from the exclusive OR circuit 16 is inverted by an inverter 21 and supplied to an adding circuit 22. Meanwhile, the exclusive OR circuit 18 performs an exclusive OR operation on the output signals from the exclusive OR circuits 17 and 15. An output signal FS from the exclusive OR circuit 18 is directly supplied to the adding circuit 22.

Figure 13:
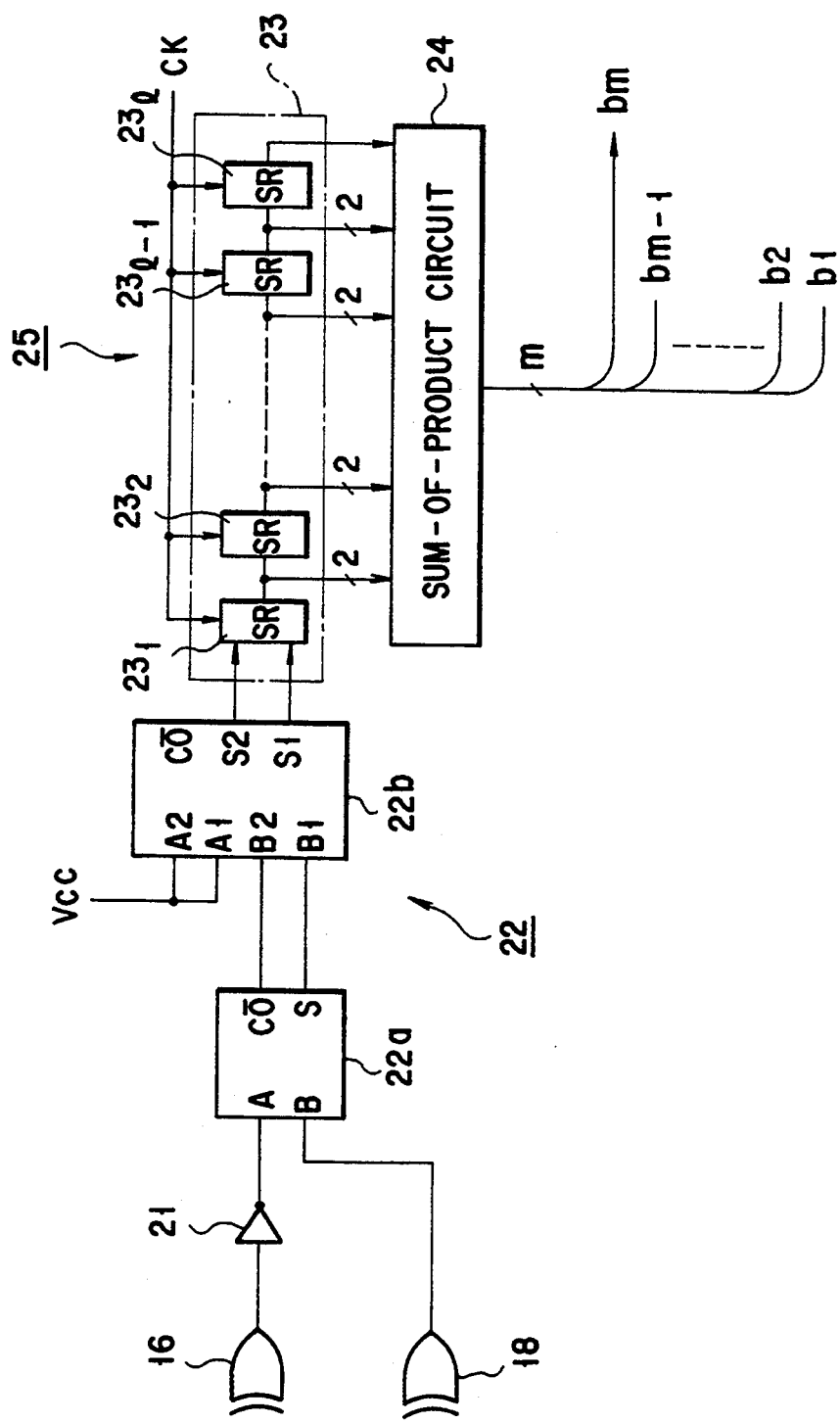
FIG. 13 is a block diagram showing the arrangement of the rear-stage portion of the FSK signal receiving device according to the fifth embodiment of the present invention.

The adding circuit 22 is constituted by a 1-bit digital adder 22$a$ and a 2-bit digital adder 22$b$, as shown in FIG. 13. The 1-bit digital adder 22$a$ adds the signal ES, supplied from the inverter 21, to the output signal FS from the exclusive OR circuit 18, and outputs 2-bit sum data. The 2-bit digital adder 22$b$ adds 2-bit data "11" to the sum data output from the 1-bit digital adder 22$a$. With this operation, the sum data is 2s-complement-conversed to obtain 2-bit data having a positive/negative value. This data is then input to a digital filter 25.

The digital filter 25 comprises a shift register 23 constituted by L cascade-connected 2-bit delay circuits, and a sum-of-product circuit 24. Of the data supplied from the adding circuit 22, a low-frequency component is extracted from a most significant bit bm of m bit outputs of the sum-of-product circuit 24 and is output as a detection signal. The 2-bit delay circuit is constituted by, e.g., two D-flip-flops, as shown in FIG. 14. Note that FIG. 15 shows a low-frequency filtering characteristic obtained by the above-described digital filter 25.

With the receiving device having such an arrangement, similar to the receiving device (FIG. 4) described with reference to the second embodiment, the amplitude level of the obtained detection signal can be doubled. In contrast to this, the sum of the amplitude levels of noise components is only $2^{\frac{1}{2}}$ (=1.4142135...) times that of the noise component of a single detection signal. With this, the S/N ratio of the detection signal can be increased, and a decrease in bit error rate can be achieved.

In addition, according to this embodiment, all the circuits from the detector 50 and the low pass filter on the output stage can be constituted by digital circuits. That is, most of the receiving device can be integrated by a CMOS process, thereby providing a compact, low-power-consumption circuit.

The present invention is not limited to the embodiments described above. For example, in each embodiment described above, a so-called direct conversion system is exemplified, in which a received FSK signal is directly frequency-converted into a base band signal. However, the present invention can be equally applied to a system in which a received FSK signal is converted into an intermediate frequency signal and is subsequently converted into a base band signal.

Various changes and modifications of the embodiments can be made within the spirit and scope of the invention, in terms of the arrangement of a phase shifting means, the phase shift amount, the arrangement of a waveshaping circuit, the arrangement of a multiplying means, the arrangement of a signal synthesizing means, the arrangement of a digital filter, the type of system to which the present invention is applied, and the like.

What is claimed is:

1. An FSK signal receiving device comprising:
   base band signal reproducing means for frequency-converting a received FSK signal to obtain first and second base band signals whose phases are orthogonal to each other;
   first phase shifting means for generating a third base band signal and a fourth base band signal having a phase orthogonal to a phase of the third base band signal by, respectively phase-shifting the first base band signal by a first phase shift and phase-shifting the first base signal and by a second phase shift orthogonal to the first phase shift;
   second signal phase shifting means for generating a fifth base band signal by phase-shifting the second base band signal by the first phase shift; and
   multiplying means for multiplying the third and fourth base band signals together to obtain a first product signal, multiplying the third and fifth base band signals together to obtain a second product signal, and multiplying the first and second product signals to obtain an output as a detection signal.

2. The device according to claim 1, wherein said first phase shifting means comprises a first digital delay circuit having a first delay time corresponding to the first phase shift for delaying the first base band signal by the first delay time to obtain the third base band signal and a second digital delay circuit having a second delay time corresponding to the second phase shift for delaying the first base band signal by the second delay time to obtain the fourth base band signal, and said second phase shifting means comprises a third digital delay circuit having the first delay time, for delaying the second base band signal by the first delay time to obtain the fifth base band signal.

3. The device according to claim 2, wherein said first phase shifting means comprises a first waveshaping circuit for shaping and converting the first base band signal into a first binary signal which is supplied to said first and second digital delay circuits, and said second phase shifting means comprises a second waveshaping circuit for shaping and converting the second base band signal into a second binary signal which is supplied to said third digital delay circuit.

4. The device according to claim 1, wherein said first phase shifting means comprises a first analog/digital converter for converting the first base band signal into a first digital signal, a first digital delay circuit for delaying the first digital base band signal by a first delay time corresponding to the first phase shift to obtain the third base band signal, and a second digital delay circuit for delaying the first digital signal by a second delay time corresponding to the second phase shift to obtain the fourth base band signal, and said second phase shifting means comprises a second analog/digital converter for converting the second base band signal into a second digital signal and a third digital delay circuit for delaying the second digital signal by the first delay time to obtain the fifth base band signal.

5. The device according to claim 1, wherein said first phase shifting means includes a first phase shifter for phase-shifting the first base band signal by the first phase shift and a second phase shifter for phase-shifting the first base band signal $\pi/2$ from the first phase shift, and said second phase shifting means includes a third phase shifter for phase shifting the second base band signal by the second phase shift.

6. The device according to claim 1, wherein said multiplying means includes logical gating means having a first exclusive OR gate circuit for performing an exclusive OR operation on the third and fourth base band signals to obtain the fist product signal, a second exclusive OR gate circuit for performing an exclusive OR operation on the third and fifth base band signals to obtain the second product signal, and a third exclusive OR gate circuit for performing an exclusive OR operation on the first and second product signals from said first and second exclusive OR gate circuits, to produce the detection signal.

7. An FSK signal receiving device comprising:
  base band signal reproducing means for frequency-converting a received FSK signal, to obtain first and second base band signals whose phases are orthogonal to each other;
  first phase shifting means for generating a third base band signal and a fourth base band signal having a phase orthogonal to a phase of the third base band signal by respectively phase-shifting the first base band signal by a first phase shift and phase-shifting the first base band signal by a second phase shift orthogonal to the first phase shift;
  second phase shifting means for generating a fifth base band signal and a sixth base band signal having a phase orthogonal to a phase of the fifth base band signal by phase-shifting the second base band signal by the first and second phase shifts, respectively;
  multiplying means for multiplying the third and fourth base band signals together to generate a first product signal, multiplying the fifth and sixth base band signals together to generate a second product signal, multiplying the third and fifth base band signals together to generate a third product signal, and multiplying the third and first product signals together to generate a fourth product signal, and multiplying the third and second product signals to generate a fifth product signal; and
  signal synthesizing means for synthesizing the fourth and fifth product signals output from said multiplying means to produce a detection signal.

8. The device according to claim 7, wherein said first phase shifting means comprises a first digital delay circuit having a first delay time corresponding to the first phase shift, for delaying the first base band signal by the first delay time to obtain the third base band signal, and a second digital delay circuit having a second delay time corresponding to the second phase shift, for delaying the first base band signal by the second delay time to obtain the fourth base band signal, and said second phase shifting means comprises a third digital delay circuit having the first delay time, for delaying the second base band signal by the first delay time to obtain the fifth base band signal, and a fourth digital delay circuit having the second delay time, for delaying the second base band signal by the second delay time to obtain the sixth base band signal.

9. The device according to claim 8, wherein said first phase shifting means comprises a first waveshaping circuit for shaping and converting the first base band signal into a first binary signal which is supplied to said first and second digital delay circuits, and said second phase shifting means comprises a second waveshaping circuit for shaping and converting the second base band signal into a second binary signal which is supplied to said third and fourth digital delay circuits.

10. The device according to claim 7, wherein said first phase shifting means comprises a first analog/digital converter for converting the first base band signal into a first digital base band signal, a first digital delay circuit for delaying the first digital base band signal by a first delay time corresponding to the first phase shift, to obtain the third base band signal, and a second digital delay circuit for delaying the first digital base band signal by a second delay time corresponding to the second phase shift to obtain the fourth base band signal, and said second phase shifting means comprises a second analog/digital converter for converting the second base band signal into a second digital base band signal, a third digital delay circuit for delaying the second digital base band signal by the first delay time to obtain the fifth base band signal, and a fourth digital delay circuit for delaying the second digital base band signal by the second delay time to obtain the sixth base band signal.

11. The device according to claim 7, wherein said signal synthesizing means comprises a calculating circuit for calculating one of the fourth and fifth product signals and a difference between the fourth and fifth product signals to obtain the detection signal, and a digital filter for filtering the detection signal to remove unnecessary frequency components from the detection signal output from said calculating circuit.

12. The device according to claim 7, wherein said first phase shifting means includes a first shifter for phase-shifting the first base band signal by the first phase shift and a second phase shifter phase-shifting the first base band signal $\pi/2$ from the first phase shift, and said second phase shifting means includes a third phase shifter for phase-shifting the second base band signal by the first phase shift and a fourth phase shifter for phase-shifting the second base band signal by the second phase shift.

13. The device according to claim 7, wherein said multiplying means includes logical gating means having a first exclusive OR gate circuit for performing an exclusive OR operation on the third and fourth base band signals to output the first product signal, a second exclusive OR gate circuit for performing an exclusive OR operation on the fifth and sixth base band signals to output the second product signal, a third exclusive OR gate circuit for performing an exclusive OR operation on the third and fifth base band signals to output the third product signal, a fourth exclusive OR gate circuit for performing an exclusive OR operation on the first and third product signals to output the fourth product signal, and a fifth exclusive OR gate circuit for performing an exclusive OR operation on the second and third output signals to output the fifth product signal.

14. An FSK signal receiving device comprising:
base band signal reproducing means for frequency-converting a received FSK signal to obtain first and second base band signals whose phases are orthogonal to each other;
first phase shifting means for phase-shifting the first base band signal by a first phase shift $\phi 1$ and a second phase shift $\phi 2$ orthogonal to the first phase shift to obtain a third base band signal AIa and a fourth base band signal AIb represented by the following equations:

$$AIa = \cos(2\pi\delta t + \phi 1)$$

$$AIb = \cos(2\pi\delta t + \phi 2);$$

second phase shifting means for phase-shifting the second base band signal by a third phase shift $\phi 3$ to obtain a fifth base band signal AQ represented by the following equation:

$$AQ = \pm\sin(2\pi\delta t + \phi 3)$$

where
$\delta$: a frequency shifter, t: time, and $$\phi 3 = \phi 2 = \pi/2 + \phi 1;$$

and multiplying means for multiplying the third and fourth base band signals together to obtain a first product signal, multiplying the third and fifth base band signals together to obtain a second product signal and multiplying said first and second product signals together to obtain an output as a detection signal.

15. An FSK signal receiving device comprising:
base band signal reproducing means for frequency-converting a received FSK signal to obtain first and second base band signals whose phases are orthogonal to each other;
first phase shifting means for phase-shifting the first base band signal by a first phase shift $\phi 1$ and a second phase shift $\phi 2$ orthogonal to the first phase shift to obtain third and fourth base band signals AIa and AIb represented by the following equations:

$$AIa = \cos(2\pi\delta t + \phi 1)$$

$$AIb = \cos(2\pi\delta t + \phi 2);$$

second phase shifting means for phase-shifting the second base band signal by third and fourth phase shifts $\phi 3$ and $\phi 4$ to obtain fifth and sixth base band signals AQa and AQb represented by the following equations:

$$AQa = \pm\sin(2\pi\delta t + \phi 3)$$

$$AQb = \pm\sin(2\pi\delta t + \phi 4)$$

where
$\delta$: a frequency shift, t: time, and
$\phi 3 = \phi 2$
$\phi 4 = \phi 1$
$\phi 2 = \pi 2 + \phi 1;$
multiplying means for multiplying the third and fourth base band signals together to generate a first product signal, multiplying the fifth and sixth base band signals together to generate a second product signal, multiplying the third and fifth base band signals together to generate a third product signal, multiplying the third and first product signals together to generate a fourth product signal, and multiplying the third and second product signals together to generate a fifth product signal; and
signal synthesizing means for synthesizing the fourth and fifth product signals output from said multiplying means to produce a detection signal.

* * * * *

UNITED STATES PATENT AND TRADEMARK OFFICE
CERTIFICATE OF CORRECTION

PATENT NO. : 5,373,533
DATED : December 13, 1994
INVENTOR(S) : Mikio HAYASHIHARA et al It is certified that error appears in the above-indentified patent and that said Letters Patent is hereby corrected as shown below:

Claim 14, Column 19, Line 47, change "shifter" to --shift--.

Signed and Sealed this

Thirteenth Day of June, 1995

BRUCE LEHMAN

Attest:

Attesting Officer

Commissioner of Patents and Trademarks